Dec. 20, 1960     J. E. WALDRUM     2,965,302
SPRAY DEVICE
Filed May 5, 1959
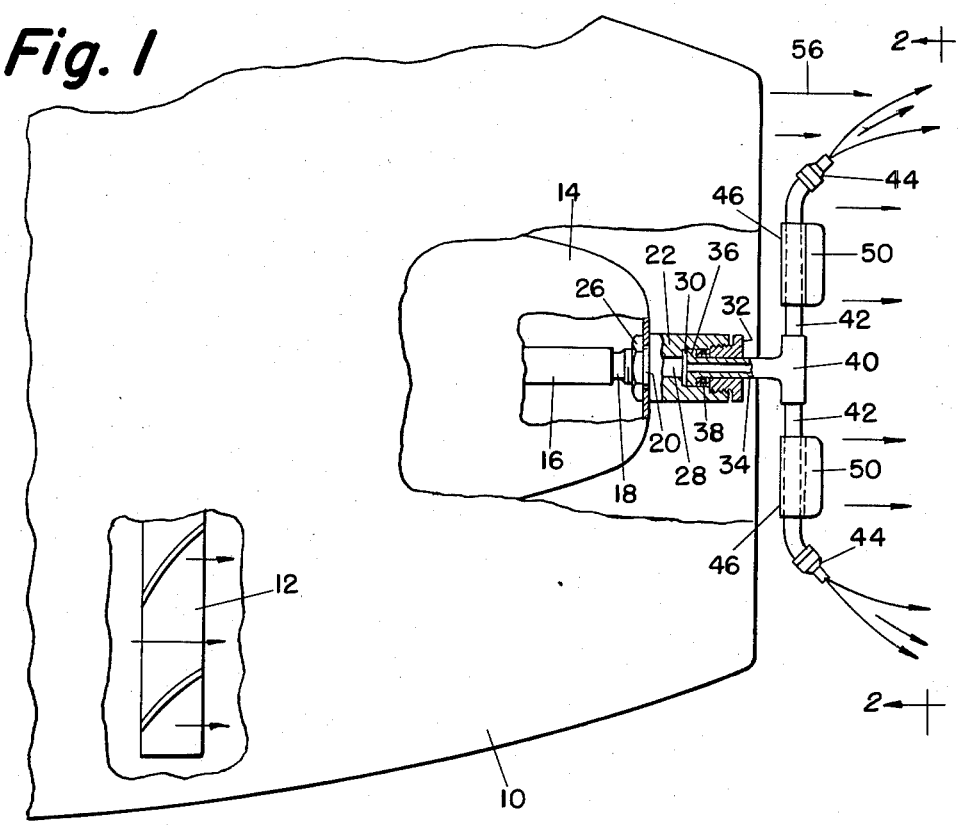
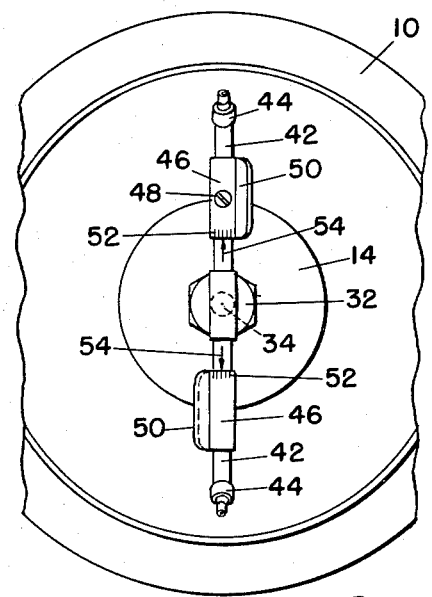
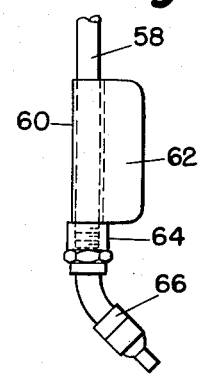
INVENTOR
JOHN E. WALDRUM
BY
*Caesar and Rivise*
ATTORNEYS.

2,965,302
Patented Dec. 20, 1960

2,965,302
SPRAY DEVICE

John E. Waldrum, Ambler, Pa., assignor to Amchem Products, Inc., Ambler, Pa., a corporation of Delaware Filed May 5, 1959, Ser. No. 811,174

7 Claims. (Cl. 239—77)

This invention relates to a spray device for applying agricultural chemicals or the like to a field, and it particularly relates to a spray device for use with relatively heavy, viscous liquids.

Quite often, agricultural chemicals such as herbicides, etc., are applied in the field by mechanisms generally known as mist applicators or cyclone applicators. Essentially, such mechanisms comprise a fan, usually enclosed in a shroud, and an orifice for introducing the liquid to be sprayed into the air blast created by the fan. The fan is of a high velocity type, often generating blasts of air of ninety miles an hour or more.

The orifice for injecting the fluid to be sprayed into the air blast was heretofore usually either provided in the hub of the fan or a plurality of orifices was provided on the shroud in a position to inject the liquid into the air blast in the form of a stream.

The above-mentioned systems were usually quite satisfactory for water-thin liquids; however, when relatively thick, viscous liquids were used, and particularly when such liquids had a tendency to work-harden, a considerable pumping force was necessary to get the liquids into the blast of air. In those cases where considerable thickening and hardening took place, such modes of application were found to be practically useless.

It is one object of the present invention to overcome the aforesaid disadvantages of the prior type sprayers by providing a spraying device which is capable of being used with viscous and hardenable spraying liquids without becoming easily clogged.

Another object of the present invention is to provide a spraying device of the aforesaid character which is relatively simple yet sturdy in construction.

Another object of the present invention is to provide a spraying device of the aforesaid character which is adjustable both in regard to the amount of liquid sprayed and in regard to the width and type of spray pattern obtained.

Other objects and many of the attendant advantages of this invention will be readily appreciated as the same becomes better understood by reference to the following detailed description when considered in connection with the accompanying drawings wherein:

Fig. 1 is a side view, partly in section and partly in elevation, of a spray assembly embodying the present invention.

Fig. 2 is a fragmentary end view taken on line 2—2 of Fig. 1.

Fig. 3 is a fragmentary side elevational view of a modified form of the invention.

Referring in greater detail to the various figures of the drawings wherein similar reference characters refer to similar parts, there is shown a shroud 10 enclosing a fan 12 mounted for rotation on a hub 14 and driven by a power source (not shown) which may be an electric motor, an internal combustion engine or any other desirable source of power.

Within the hub 14 is provided a conduit 16 which leads out from the hub to a source (not shown) of sprayable liquid. The conduit 16 is connected at its forward end to a nipple 18 which extends through an aperture 20 in the front of the hub; this nipple 18 being in threaded engagement with an internally-threaded bore in a housing 22. A hex nut 26 holds the nipple 18 and housing 22 coupled to the front wall of the hub.

The housing 22 is provided with a central passage 28 mating with the nipple 18, this passage having a counterbore 30. The forward portion of the counterbore is internally threaded to receive an externally threaded gland 32.

The gland 32 is centrally bored to rotatably support a hollow shaft 34 having a flange 36 at its rear end. This flange 36 is received in the counterbore 30, a thrust bearing 38 being provided in the counterbore between the flange 36 and the gland 32.

The shaft 34 is provided at its forward end with a T-coupling portion 40. Extending from opposite ends of the coupling 40 are a pair of oppositely-extending hollow arms 42, each having an angularly-extending nozzle 44 at the outer end thereof. Each arm 42 is further provided with a longitudinally and rotatably adjustable collar 46 having a set-screw 48 for holding it in its various positions of adjustment. Extending angularly from each collar 46 is a blade 50. If desired, calibrated index marks 52 may be provided on each collar, such index marks coacting with an arrow or the like, indicated at 54 on each arm 42, to indicate the rotational position of the collars and therefore the angle of attack of the blades 50 attached to the collars. If desired, a longitudinal scale may also be provided to indicate the longitudinal adjustment of the collars.

In operation, the fan is started and the liquid is passed from the source thereof through the conduit 16 either by gravity feed or by suitable pumping means. This liquid then passes through the nipple 18 into the shaft 34.

As the fan rotates, it provides an air blast (indicated at 56) which passes from the shroud against the blades 50. The force of the air blast on the blades 50 acts to rotate the arms 42 which thereby discharge by centrifugal force the liquid entering thereinto from the hollow shaft 34. By adjusting the blades 50, various speeds of rotation can be obtained, thereby varying the amount of liquid discharged for a given air velocity.

In addition to varying the amount of liquid discharged from the nozzles, it is also often desirable to adjust the width and type of spray pattern. For this purpose, a modified form of the device may be used such as illustrated in Fig. 3. In this form of the device, each arm 58, corresponding to the arms 42 of Figs. 1 and 2, is provided, below its collar 60 and blade 62, with an externally threaded end adapted to receive an internally threaded coupling portion 64 of an adjustable nozzle 66. By this type of construction, the nozzles 66 can be swivelled to adjust the width and pattern of the spray as desired.

Although two hollow rotatable spray arms 42 are illustrated, it is to be understood that the number of such arms may vary as desired.

Obviously many modifications and variations of the present invention are possible in the light of the above teachings. It is, therefore, to be understood that within the scope of the appended claims, the invention may be practiced otherwise than as specifically described.

What is claimed as the invention is:

1. A spray device comprising a power-driven fan mounted on a hub, a shroud enclosing said fan but having an open end opposed to said fan, a conduit within said hub, said conduit being connected at one end to a source of fluid and at the opposite end to a hollow, rotatable shaft extending through the open end of said shroud, said shaft being provided with a plurality of radially-extending hollow arms outside of said shroud, said arms being in fluid communication with said shaft and being provided with nozzles at their outer ends, and a laterally projecting blade positioned on each of said arms in the downstream path of air flow from said fan.

2. The spray device of claim 1 wherein said blades are rotatably and longitudinally adjustable on their corresponding arms.

3. The spray device of claim 1 wherein said nozzles are swiveled to their corresponding arms.

4. A spray device comprising a power-driven fan mounted on a hub, a shroud enclosing said fan but having an open end opposed to said fan, a conduit in said hub, said conduit being connected at one end to a source of fluid and at the opposite end being coupled in fluid connection with a housing mounted on the forward end of said hub, said housing having a fluid passage therein in fluid connection with a rotatable hollow shaft, said shaft extending forwardly from said housing to an area outside said shroud, said shaft being connected, outside said shroud, to a plurality of radially extending hollow arms, each of said arms being in fluid communication with said shaft and having a nozzle at the free end thereof, each of said arms being further provided with a laterally extending blade positioned in the downstream flow path from said fan.

5. The spray device of claim 4 wherein said nozzles are each angularly adjustable relative to their corresponding arms.

6. The spray device of claim 4 wherein each of said blades are rotatably and longitudinally adjustable relative to their corresponding arms.

7. The spray device of claim 4 wherein indicating means are provided for indicating the adjustments of said blades relative to their corresponding arms.

References Cited in the file of this patent

UNITED STATES PATENTS 1,974,538     Johnston _____ Sept. 25, 1934